(12) United States Patent
Uhlik et al.

(10) Patent No.: US 8,101,000 B2
(45) Date of Patent: *Jan. 24, 2012

(54) WIRELESS NETWORK INFRASTRUCTURE

(75) Inventors: Christopher Uhlik, Danville, CA (US); Michael Youseffmir, Portola Valley, CA (US)

(73) Assignee: Durham Logistics, LLC, Las Vegas, NV (US)

( * ) Notice: Subject to any disclaimer, the term of this patent is extended or adjusted under 35 U.S.C. 154(b) by 1155 days.

This patent is subject to a terminal disclaimer.

(21) Appl. No.: 11/506,378

(22) Filed: Aug. 18, 2006

(65) Prior Publication Data

US 2007/0042752 A1    Feb. 22, 2007

Related U.S. Application Data

(62) Division of application No. 09/967,152, filed on Sep. 28, 2001, now Pat. No. 7,369,841.

(51) Int. Cl.
*H04M 11/00* (2006.01)

(52) U.S. Cl. ......................................................... 55/406
(58) Field of Classification Search .................. 455/406, 455/408, 405, 407, 450, 452.2, 509, 464, 455/67.11, 411, 453, 67.13, 414.1; 709/225, 709/203, 224; 713/182–183; 370/352, 469, 370/237, 343, 453, 392, 329, 252, 310, 520, 370/401, 450, 452.2, 241, 408, 328, 235, 370/331, 260, 389, 254, 340, 336, 242, 230.1, 370/232; 1/1; 705/8

See application file for complete search history.

(56) References Cited

U.S. PATENT DOCUMENTS

| | | | |
|---|---|---|---|
| 5,893,903 A * | 4/1999 | Eisdorfer et al. | 705/8 |
| 6,553,022 B2 * | 4/2003 | Hartmaier | 370/352 |
| 6,640,097 B2 * | 10/2003 | Corrigan et al. | 455/414.1 |
| 6,680,923 B1 * | 1/2004 | Leon | 370/328 |
| 6,694,316 B1 * | 2/2004 | Langseth et al. | 1/1 |
| 6,754,833 B1 * | 6/2004 | Black et al. | 726/7 |
| 7,127,232 B2 | 10/2006 | O'Neil | |
| 7,299,284 B2 | 11/2007 | McKinnon et al. | |
| 7,448,080 B2 * | 11/2008 | Karjala et al. | 726/15 |
| 7,451,198 B2 * | 11/2008 | Natarajan | 709/221 |
| 7,454,195 B2 * | 11/2008 | Lewis et al. | 455/412.1 |
| 7,542,755 B2 | 6/2009 | Uhlik | |
| 7,596,213 B2 | 9/2009 | O'Neil | |
| 7,706,775 B2 | 4/2010 | Uhlik | |
| 2002/0068607 A1 | 6/2002 | Altschul et al. | |
| 2002/0069244 A1 * | 6/2002 | Blair et al. | 709/203 |
| 2002/0075844 A1 * | 6/2002 | Hagen | 370/351 |
| 2002/0138635 A1 | 9/2002 | Redlich et al. | |
| 2002/0191572 A1 | 12/2002 | Weinstein et al. | |
| 2003/0233329 A1 | 12/2003 | Laraki et al. | |
| 2004/0033797 A1 | 2/2004 | Raivisto et al. | |
| 2004/0053599 A1 | 3/2004 | Karaoguz et al. | |
| 2005/0014484 A1 | 1/2005 | Karaoguz et al. | |
| 2005/0044216 A1 | 2/2005 | Zhang et al. | |
| 2005/0136899 A1 | 6/2005 | Pines et al. | |
| 2007/0042750 A1 | 2/2007 | O'Neil et al. | |
| 2007/0121849 A1 * | 5/2007 | Uhlik et al. | 379/114.28 |

OTHER PUBLICATIONS

USPTO; File History U.S. Appl. No. 09/967,152 (issued 7,369,841) to Uhlik et al., filed Sep. 18, 2001.

(Continued)

*Primary Examiner* — Melody Mehrpour

(74) *Attorney, Agent, or Firm* — Stolowitz Ford Cowger LLP

(57) ABSTRACT

An access point of a network maintains information about data received at the access point from a server accessible via the network and provides to the server the information maintained at the access point. The access point then receives from the server a payment for an account associated with an operator of the access point.

46 Claims, 1 Drawing Sheet

OTHER PUBLICATIONS

USPTO; File History U.S. Appl. No. 11/506,323 (issued 7,542,755) to Uhlik et al., filed Aug. 18, 2006.
USPTO; File History U.S. Appl. No. 11/506,546 to Uhlik et al., filed Aug. 18, 2006.
Stolowitz Ford Cowger LLP; Related Case Listing; May 12, 2010; 1 Page.
USPTO; File History U.S. Appl. No. 11/506,546 to Uhlik et al., filed Aug. 18, 2006; through Dec. 2009.

* cited by examiner

WIRELESS NETWORK INFRASTRUCTURE

This is a divisional of U.S. patent application Ser. No. 09/967,152, filed on Sep. 28, 2001 now U.S. Pat. No. 7,369,841.

TECHNICAL FIELD

This invention generally relates to wireless communication systems and, more particularly, to a business model for expanding a wireless network architecture.

BACKGROUND

Wireless Internet services are available today, utilizing, for example, standard wireless protocols such as Cellular Digital Packet Data, also known as "wireless Internet Protocol" (wireless P). (See CPDP System Specification and Implementation Guidelines, Release 1.1, Wireless Data Forum, Washington, D.C.) CDPD can be implemented in American Mobile Phone Systems (AMPS) cellular networks, and thus a wireless Internet service based thereon could become widely available, but the service is slow (given a data transmission rate of 19.2 kbps) and expensive (approximately $1.40 per megabyte of data transmitted). (The AMPS is a frequency division multiple access (FDMA) analog cellular system developed by AT&T Bell Labs in the 1970s).

Additionally, wireless local area networks (WLANs), for example, those based on the IEEE 802.11 standard, are emerging. (For further information regarding the IEEE 802.11 standard, refer to IEEE 802.11, 1999 Edition (ISO/IEC 8802-11: 1999) *IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications*; IEEE 802.11a-1999: 8802-11:1999/Amd 1:2000(E)), *IEEE Standard for Information technology—Teleconnnunications and information exchange between systems—Local and metropolitan area networks—Specific requirements—Part 11: Wireless LAN Medium Access Control (MAC) and Physical Layer (PHY)>specifications—Amendment 1: High-speed Physical Layer in the 5 GHz band*; and IEEE 802.11b-1999: *Supplement to 802.11-1999, Wireless LAN MAC and PHY specifications: Higher speed Physical Layer (PHY) extension in the 2.4 GHz band*.)

Increasingly popular 802.11b WLANs currently offer ~6 Mbps (11 Mbps instantaneous peak) data transmission rates over a range of ~100 meters and soon will increase to ~30 Mbps. Besides the relatively high speeds achieved by IEEE 802.11 based WLANs, such WLANs generally have no service fees. However, because of this, there is no incentive for operators to install IEEE 802.11 networks for public use. Thus coverage is limited to private networks.

In summary, the wireless Internet service available today is an expensive, fragmented service with limited coverage. To obtain reasonable data transmission rates and service coverage, one could maintain a CDPD subscriber account, and carry a CDPD PCMCIA modem card, and an 802.11 WLAN PCMCIA card. A home or office computer would utilize the 802.11 WLAN PCMCIA card, and the CPDP PCMCIA card for general use outside the home or office.

Network operators have not embraced development of a wireless infrastructure because of the perceived need to acquire sufficient licensed radio frequency spectrum to build out a nation-wide network, a costly undertaking. With the uncertainties raised by the introduction of other technologies such as GPRS/EDGE and CDMA-2000, and the recent history of the wireless market, these operators are proceeding slowly and cautiously.

What is needed is a business model, network architecture and protocols that facilitate development and operation of a wireless infrastructure to provide ubiquitous wireless Internet access.

BRIEF DESCRIPTION OF THE DRAWINGS

The present invention is illustrated by way of example, and not necessarily by way of limitation in the figures of the accompanying drawings in which like reference numerals refer to similar elements.

DETAILED DESCRIPTION

Figure 1:
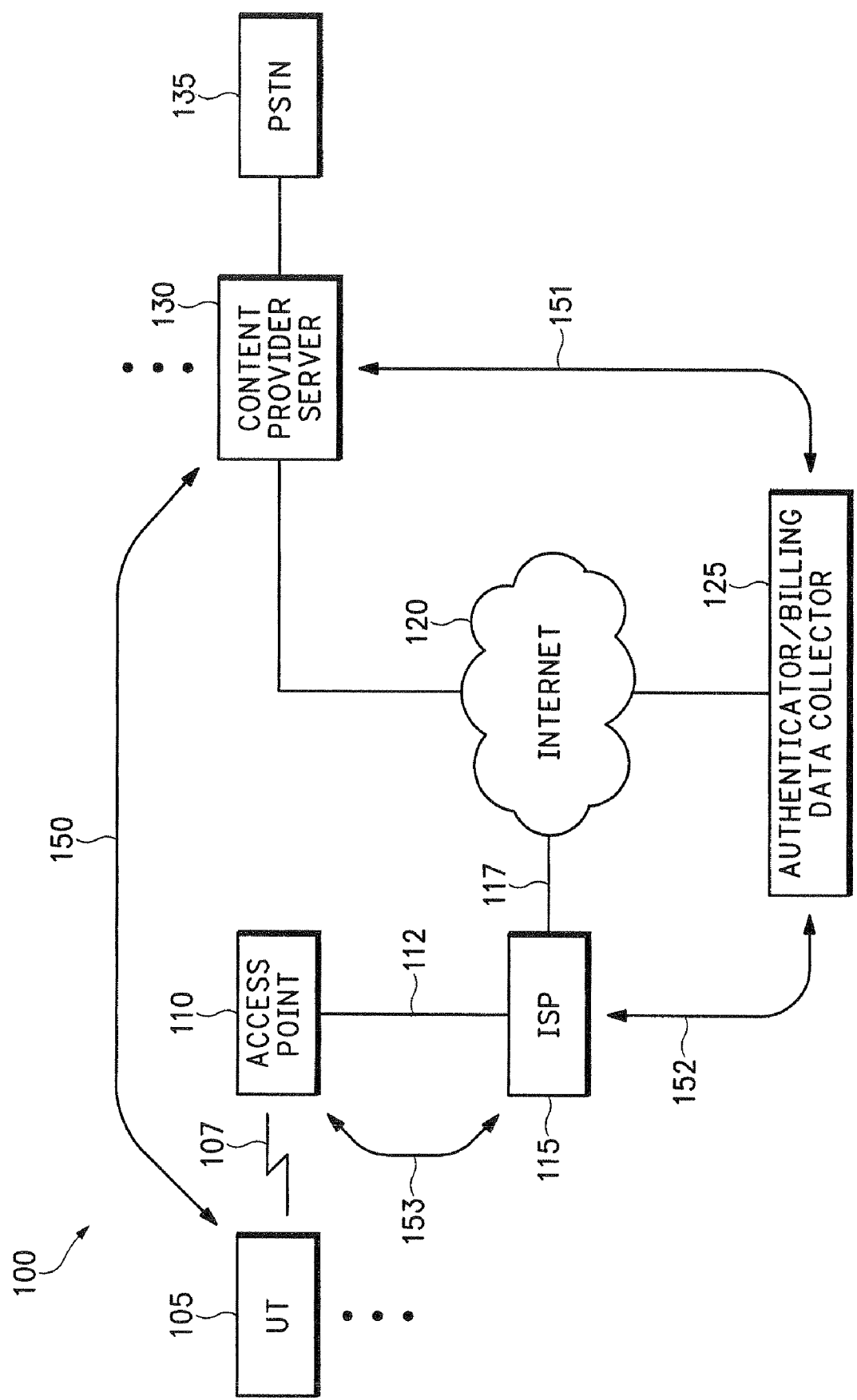
FIG. 1 illustrates an embodiment of the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

A business model, network architecture and software are described for implementing and operating a world-wide wireless internetwork infrastructure. The infrastructure includes a distributed wireless packet data network based on wireless local area networking (WLAN) technology and utilizing high speed (e.g., 1-11 megabits per second data rates), low cost wireless data terminal equipment (e.g., less than $100). However, it is appreciated that wireless technology and data terminal equipment are not sufficient incentives, on their own, to build a wireless network—also needed are the economic incentives to invest in building a comprehensive network necessary to support a wide variety of wireless network services.

The invention described herein aligns the interests of wireless base station operators, Internet service providers (ISPs), and content providers, and provides a means by which money flows from end users to content providers and then back to the ISPs and wireless base-station operators, thus providing an incentive to expand the wireless network infrastructure. In this manner, it is expected that, for example, thousands of entities become independent wireless base station operators. It is contemplated that some entities, such as individuals, will become base station operators for a cut of the subscriber revenue stream. Other entities, such as hotels and restaurants, will do so because their regular customers see wireless Internet coverage as a value added service. Still others will set up and operate base stations in their homes and offices simply for personal use. As a side effect of all of these interests, a wireless network infrastructure will expand to cover areas in which end users want to, and can, use their UTs.

The invention provides an environment for content providers to develop wireless services for end users while returning a fraction of the content providers revenues, for example, to the network, for distribution back to the Internet Service Providers (ISPs), and/or the radio base-station operators. It is contemplated that every entity is capable of being independent of the others, from the wireless radio base-station operators, the ISPs, to the content providers.

FIG. 1 illustrates one embodiment of the invention 100, in which independent radio base-station operators build ubiquitous wireless Internet coverage based on monetary incentives. Prior art approaches to providing such coverage suffer from scaling problems that limit the rate of growth and adoption— it is a huge task for a single or small number of entities to build and operate a complete network, market user terminals, bill subscribers, acquire radio frequency spectrum, etc. The invention differs from such other models, e.g., Metricom's now defunct Ricochet wireless Internet approach, mainly by distributing responsibility for base-station acquisition, siting, and operation to independent base-station operators in exchange for some portion of end user or subscriber revenues.

A user terminal (UT) 105 communicates with a server, for example, a server 130 connected to the Internet 120 and operated by a content service provider, such as Amazon.com. The term user terminal, as used herein, refers to a user device or user equipment. Additionally, a user is a device or application attached to or coupled with the UT, and an end user or subscriber is a person or entity owning or using the user/UT. The subscriber periodically pays for Internet based services, such as Voice over Internet Protocol (Voice over IP, or VoIP) phone calls, book purchases, stock quotes, etc., as represented by arc 150 in FIG. 1. A portion of these payments are distributed by the network infrastructure to the providers of the various network data carrying services actually used (denoted by arcs 151 and 152), including the operator of a wireless base station (denoted by arc 153).

The UT may be any electronic device having wireless radio frequency communication capabilities, or coupled to or with a device having radio frequency communication capabilities, such as a wireless modem. Additionally, software, such as driver software, may be resident in the UT so the UT can operate in a network in accordance with the present invention.

For example, the UT may be a desktop or laptop computer, a personal digital assistant (PDA), cellular telephone, two-way pager, or the like. In one embodiment, UT 105 contains a radio that transmits and receives Internet Protocol (IP) datagrams or packets to and from the Internet 120. The radio can be a PCMCIA card-based wireless modem. The UT communicates with server 130 via a wireless radio frequency link 107.

A wireless access point 110, or simply, access point 110, is a wireless base-station that collects packets from and distributes packets to user terminals in its wireless coverage area. The access point typically is coupled via a link 112 to ISP 115, which in turn, connects to the Internet 120 via link 117. Ideally link 112 is fast and inexpensive (e.g. cable modem, xDSL line, wireless point-to-multipoint, etc.) but it could also be a simple dial-up connection, depending on the base station hardware and software, base station location, and amount of traffic transmitted via the base station. A person or business may be the owner and/or operator of one or more such access points.

The access point 110 can be an IEEE 802.11 base station, capable of communicating with user terminals via the radio frequency link 107 using a wireless protocol such as IEEE 802.11. While FIG. 1 illustrates a single UT and a single access point or wireless radio base station, it is appreciated that many base stations and many more UTs are utilized, indeed, desired, to support, for example, a nationwide wireless network infrastructure.

In one embodiment, the access point, in addition to providing wireless service coverage for UTs in its service area, collects billing information, for example, based on data traffic processed by the access point. The access point collects traffic data, that is, statistical data about the data traffic, necessary for billing. The access point operator receives payments, as represented by arc 153, for providing wireless Internet services. The payments can be calculated, at least in part, based on the billing information collected by the access point. The access point furthermore may collect billing information on a per UT basis, so that depending on the type of subscriber account associated with the user of the user terminal, the subscriber can be billed, that is, an accounting for services is posted to the subscriber account, and the access point can receive a portion of a payment by the subscriber for the bill, based on the posting. For example, for flat rate service (e.g., a subscriber pays $20/month), the access point need only count bytes, or number of packets, of traffic carried, while for measured rate service (e.g., a subscriber pays $15/month plus $0.10 per megabyte (MB) over 50 MB per month and $0.05 per MB over 200 MB per month), a byte count per UT (as identified, for example, by the UT's MAC address) is maintained. Alternatively, service could be measured in terms of connect time, for example, per-minutes or per-day connect-time. Connect time may be the amount of time the user terminal is associated with a WAP, or the amount of time the user maintains a session with a server via a connection to the server established via the WAP.

The access point includes software that routes IP packets, collects billing information, and cooperates with the other network entities to deliver network services. Alternatively, such software may reside in the ISP 115. Given the ISP's possible hardware platforms likely are more varied than the access point's possible hardware platforms, it may be, from a developer's perspective, better to develop router software for access points rather than ISP hardware platforms. Ultimately, it is contemplated that this software will be capable of being executed on many access point platforms. However, initially it is contemplated to run on a Microsoft Windows98/Windows2000/WindowsNT PC with a wireless LAN base station coupled thereto.

The router software performs many functions, including requesting authentication of WLAN MAC addresses as new user terminals request admission to the network; keeping track of local, private user terminals which may be allowed to use the network free of charge; filtering unauthorized traffic; providing fire-wall services so that public user terminals cannot send and receive packets to machines on a private LAN; coordinating hand-over of a roaming user terminal with other access points; tunneling (encapsulating) traffic to other access points after a roaming user terminal subscribing to full or partial mobility service has moved on to another access point; unwrapping (decapsulating) traffic tunneled to the user terminal's present access point from the user terminal's original access point; and collecting billing traffic summary statistics (for example, by user terminal) and storing them for upload to the billing entity.

In one embodiment of the invention, access point concentration is provided by a conventional wired Internet Service Provider (ISP) 115. That is, multiple access points access the Internet via the same ISP. In particular; each access point 115 is connected to the Internet 120, usually by the back-haul services provided by the ISP. The ISP usually has a high-speed trunk connection 117 to the Internet 120. The high-speed trunk is often a T1, T3, or ATM connection.

Responsibility for customer billing and marketing may or may not be distributed among Internet-based content and service providers, many of whom provide specialized services with specialized terminal equipment (e.g., a VoIP phone). To the extent billing is in distributed between various service providers, the revenue/value chain is more complicated, but in any case, investment is further distributed and the potential for wireless network infrastructure growth is expanded in accordance with the present invention.

An authenticator 125 is connected to the Internet 120 and provides authentication services to access points and user terminals. The authenticator 125 charges a fee to content service providers, such as the content service provider operating server 130, for allowing subscribers access to the network 100. The fee provided the authenticator, represented by arc 151, is some portion of subscriber payments to content service provider 130 for providing, among other things, authentication services for the content service provider and the provider's subscribers. Router software, whether executing on the hardware platform of the access point or ISP, queries the authenticator as to whether to provide packet delivery services for a given user. The authenticator, using encryption software, communicates with a user terminal, in particular, software such as driver software, on the user terminal, to authenticate the user. In one embodiment, the authenticator also queries the content service provider to verify the subscriber has adequate credit standing to gain access to the network.

Upon receiving a response from the authenticator, router software decides whether to continue to provide packet routing and delivery services for a particular user terminal. If authentication fails, then service for the user terminal is unavailable. In one embodiment, the authenticator also provides a code to the router software for use in generating encrypted billing information for that user terminal. The authenticator collects traffic data statements from router software, via the ISP back haul line 117, and stores the statements for use in calculating usage-based payments back to ISPs and access point operators, respectively represented in FIG. 1 by arcs 152 and 153. In one embodiment, if the authenticator and billing entity functionality is distributed among different platforms and/or service providers, the authenticator further uploads the collected billing traffic statistics to the billing entity hardware/service provider. In one embodiment, communication between the access point and the authenticator is encrypted to prohibit impersonation of the authenticator and/or access point.

The content service provider operating, for example, server 130, provides Internet content for which a subscriber is willing to pay money, for example, a subscription fee. In the case of a subscription fee based service, the content service provider collects periodic payments from subscribers and pays the network access bills generated by the authenticator. The authenticator then distributes some portion of these revenues, referred to herein as a rebate, back to ISPs and/or access point operators based on the services they provided (e.g., number of bytes transmitted). In some content service provider models, no value-added content is served—the subscriber simply gets an Internet connection in a fee-for-bytes or flat-rate arrangement similar to a conventional, wired ISP.

The rebates can be tiered based on how much an operator pays for a base-station. Subsidized base-stations might carry a smaller rebate than ones sold without subsidy. In fact, overpayment for base-stations is possible to provide a means for an operator to invest in the billing entity service provider.

Although not shown in FIG. 1, a Home Location Register (HLR) may optionally be utilized in the network 100. The HLR comprises an Internet resident database of user in terminal locations. Router software or driver software updates records in the HLR as mobile user terminals move about from WLAN to WLAN, that is, from one access point to another access point, or from one ISP to another ISP. In one embodiment of the invention, the content service provider may provide the HLR.

In conjunction with the optional HLR, an optional mobility service is available to a user terminal. The service provides a fixed IP address for a mobile user terminal. A mobility service provider can keep track of the whereabouts of a user terminal, with reference to the HLR. The actual implementation of mobility services depends on the underlying service. Mobility services provided by a single server can simply follow the user terminal around as the IP address assigned to the user terminal changes.

An important underlying principle of the wireless network architecture and business model contemplated by the present invention is that all entities participating in the set up and operation of the network should have something to gain from expanding and improving the network and its services. For example, content service providers such as Amazon, Yahoo, Net2Phone, etc., get customers that the content providers can target with merchandise, wireless devices, and services of all kinds. A music company can sell songs for a wireless MP3 portable music database/player. An Internet VoIP phone company can sell voice communications services. An online bookstore can sell books that a subscriber downloads and reads on a portable electronic device. Online magazines can sell access to their services. A medical monitoring company can sell real-time analysis of heart rhythms, possibly detecting a heart attack before it happens. The potential applications are numerous.

Ubiquitous, high-speed, wireless Internet service opens new opportunities for providing content and services. The application content service providers increase revenue from a growing user base. Users subscribe because of all the available content. Furthermore, the application content service providers market wireless devices and services that build the user base fueling demand for the network.

Subscribers get access to a wide range of goods and services made possible by high speed, ubiquitous wireless Internet service coverage. A subscriber gets "tetherless Internet access" near any access point. The number of installed access points increases until wireless Internet service coverage becomes ubiquitous. As WLAN technologies improve, data rates increase. However, the subscriber need not wait for a full network deployment to perceive significant value. The subscriber can purchase a personal access point and have tetherless Internet access in their home or office, which is the key to getting the wireless network infrastructure in place.

As mentioned above, Internet Service Providers (ISPs) provide back-haul services from wireless access points to the Internet. A rebate scheme is structured such that the ISPs are paid for the data traffic that they transport between the Internet and access points, however calculated. Thus, it is in the interest of ISPs to encourage the installation of more and more access points providing coverage and increasing wireless Internet usage.

In one embodiment, ISPs also provide fixed IP addresses and mobility management services for users who wish to maintain a continuous Internet connection while roaming between WLANs. For services that require these continuous connections, (e.g., VoIP services) content service providers may contract with ISPs to provide fixed virtual connections to mobile users. This fixed IP address and mobility management service performs the same function as an HLR in a cellular telephone network, which are well known in the art, and thus not discussed further herein.

It is contemplated that some access point operators will install base stations just to get wireless Internet service coverage where needed for their own use-as subscribers. A typical example of this scenario would be a home user who buys an access point to get coverage in their home. Back-haul services would be provided through a cable modem, xDSL line, or even dial-up modem. Depending on the range of the WLAN technology embodied in the base station, the home user might incidentally be providing service to their neighbors, for example, in apartment buildings. Another example is businesses that install base stations to provide tetherless Internet access within their facility. Security features in the access point router software would provide different routing services for company employees versus "foreign" users. For example, employees may be allowed to mount directories on a local file server, but foreign users would not see any local servers.

However important these incidental access point operators are to providing ubiquitous wireless Internet service coverage, the rebate scheme is structured to ensure an incentive to become an access point operator. Airports, hotels, coffee shops, libraries, bookstores, shopping malls, etc., will install access points for the revenue generated by rebate payments. This financial feedback is what drives operators to provide service at locations desired by users and to split wireless service areas to provide adequate capacity.

Eventually, it is envisioned that the subscriber base might be large enough that establishments such as coffee shops, bookstores, and hotels provide coverage on their premises as a service to their customers simply to maintain competitiveness in drawing customers.

The clearest incentive is to the authenticator/billing entity, which is the primary collector of the subscriber generated revenue stream, with a portion of this revenue provided to access point operators and ISPs as a rebate. The authenticator, or authentication service provider, maintains the keys to access network 100. No user terminal can access a foreign WLAN without permission from the authenticator. The authenticator also collects billing information (for example, VoIP telephone call detail records) from the ISPs for each user terminal session. This billing data is provided to content service providers for use in billing the user. The content service provider pays the authenticator to keep subscribers in the authenticator's database, thereby ensuring continued access to the network 100.

Manufacturers are presented with the opportunity to sell base stations and user terminals. Access points are not sold to a small group of large operators—instead, access points are high volume consumer electronics devices. Likewise, user terminals need not be tied to specific service providers. They can be sold directly to consumers and retailers.

Any number of content service providers can utilize network 100 and the business model described above to provide applications to subscribers. A brief description of some possible content services follows.

The simplest service is a general Internet Protocol (IP) packet delivery service. The UT in this case may be a WLAN card in a laptop PC. The services provided to the subscriber include various Internet application protocols, including HTTP (world wide web browsing), telnet, FTP, etc. The content service provider has no infrastructure other than billing, takes call detail information from the Authenticator, debits the subscriber's billing account, and sends an account statement, for example, via electronic mail, to the subscriber. The bulk of the subscription fee is transferred (as designated by arc 151 in FIG. 1) to the authenticator and then distributed to the ISPs (arc 152) and access point operators (arc 153). A typical subscription fee schedule might be:

0 to 20 MB/month @ $19.99/month, plus $1/MB for >20 MB/month

Of this, for example, 80 percent is transferred to the authenticator, and then 80 percent of that is transferred to the ISPs.

Low mobility cellular telephone service, similar to Personal Handyphone System (PHS) in Japan, can be readily provided by VoIP enabled WLAN user terminals that have the appearance of cell phones. These user terminals cooperate with application software resident either at their home ISP or at the content service provider's servers. This software coordinates the delivery of compressed voice packets between the user's terminal and a public switched telephone network (PSTN) gateway 135 nearest the termination point of the phone call. The authenticator charges the content service provider per MB of voice traffic sent from and received by the user's user terminal (i.e., phone). The content service provider bills the user, for example, based on this usage data or, for example, based on more detailed information about call sources and destinations.

An additional application contemplated by the invention is an electronic book service that comes with an electronic book reader device with storage for several books and a display. Using the book reader device, a subscriber can visit an electronic book reader service web site, browse book content, select for purchase and purchase book content, and download book content for reading when out of wireless range (e.g. on an airplane, in a car) or even have a printed copy delivered to your house. The book reader service provider and the original author are secure in the knowledge that the downloaded book cannot be copied and further distributed without physically breaching the electronic book device.

An MP3 service would operate in a manner very similar to the electronic book service, but the information content is music rather than prose. The user terminal would have real-time access to the libraries of music content. Control of the physical user terminal device and protocols allows the content service provider to be secure in the knowledge that the music downloaded will not be illegally redistributed.

One example of an implementation of an embodiment of the invention follows. A subscriber accesses an online bank via a user terminal, UT1, and purchases credit for 1000 units of Internet access for some amount of money, say $10. The units may represent any measure of Internet access, for example, bandwidth, time, quality of service, or some combination thereof. The online bank mints a certificate, N1, for the subscriber by generating a 512 bit random number, storing it in the subscriber's database record at the online bank along with an identifier for UT1, UT1_ID, and the number of units purchased, in this example, 1000 units. (The random number that is the certificate is a representation of the units purchased by the subscriber.) The random number is then encrypted and sent to the subscriber.

At some point the subscriber then accesses the Internet. An access point, AP1, receives a page from the UT1, and as part of the process of setting up a session, queries the subscriber for a deposit against future data traffic with UT1. The subscriber responds by sending the certificate to the online bank with a request that some number of units, say 2 units, be reallocated to AP1.

The online bank receives the certificate N1 from the request and verifies that UT1 indeed owns 1000 units, mints a new certificate, N2, representing 998 units for UT1, and another certificate, N3, representing 2 units for AP1, and provides the certificates to UT1 and AP1, according to the same process as described above. After both UT1 and AP1 acknowledge receiving their change (998 units) and payment (2 units), respectively, certificate N1 is removed from the subscriber's database, and certificate N2 is added in its place. The certificate N3 is added to the access point's database record maintained at the online bank as well. Alternatively, the certificate N3 is not needed; 2 credits are simply added to AP1's account balance at the online bank. At the end of a billing cycle, e.g., the end of the month, access points receive a check for their credit balance.

Although the invention has been described in the detailed description as well as in the Abstract in language specific to structural features and/or methodological steps, it is to be understood that the invention defined in the appended claims is not necessarily limited to the specific features or steps described. Rather, the specific features and steps are merely disclosed as exemplary forms of implementing the claimed invention. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

In accordance with the teachings above, we claim the following:

1. A method comprising:
   maintaining, at a wireless access point (WAP) coupled to a network, information about use of wireless user terminals that access, via the WAP, content provided via a server coupled to the network;
   providing to an operator of the server, billing information for the user terminals accessing the server, based, at least in part, on the information maintained at the WAP; and
   receiving a payment responsive to the billing information to an account associated with an operator of the WAP for providing transmission of data between the server and at least one of the wireless user terminals.

2. The method of claim 1, wherein the WAP comprises a IEEE 802.11 access point.

3. The method of claim 1, wherein the network comprises a worldwide network of interconnected networks commonly known as the Internet.

4. The method of claim 1, wherein said maintaining information comprises maintaining, at said WAP, information about data packets received a the WAP from the server and forwarded by the WAP to at least one wireless user terminal.

5. The method of claim 1, wherein the information about data received at the WAP from the server comprises a count of bytes of data received at the WAP from the server.

6. The method of claim 1, wherein the information about data received at the WAP from the server comprises a connect time during which at least one of the wireless user terminals is associated with the WAP to receive data from the server.

7. The method of claim 4, wherein the information about data packets received at the WAP from the server and forwarded by the WAP to at least one wireless user terminal comprises a count of bytes of data received and forwarded using a Media Access Control address associated with a wireless user terminal.

8. In a network having a server and a wireless user terminal coupled thereto via a wireless access point (WAP) of the network, a method comprising:
   posting to an account maintained at the WAP and associated with the wireless user terminal, an accounting of services provided by the server to the wireless user terminal via the WAP;
   receiving a payment from the WAP in response to the posting; and
   providing, from an operator of the server, a portion of the payment to an account associated with an operator of the WAP.

9. The method of claim 8, wherein providing, from the operator of the server a portion of the payment to an account associated with an operator of the WAP comprises:
   providing from the operator of the server, a portion of the payment from the account to a billing entity; and
   providing from the billing entity a portion of the payment to the account associated with an operator of the WAP.

10. The method of claim 8, wherein the billing entity and the server comprise the same device coupled to the network.

11. The method of claim 8, wherein the server is operated by a content service provider and the billing entity is a separate device operated by a network service provider.

12. The method of claim 8, wherein the WAP comprises an IEEE 802.11 base-station access point.

13. The method of claim 8, wherein the network is a network of interconnected networks commonly known as the Internet.

14. The method of claim 8, wherein posting to an account associated with the wireless user terminal an accounting of services provided by the server to the wireless user terminal comprises obtaining a count of bytes of data transmitted from the server and received at the WAP for transmission to the wireless user terminal and calculating a payment for services provided by the server to the wireless user terminal based on the count.

15. The method of claim 8, wherein posting to an account associated with the wireless user terminal an accounting of services provided by the server to the wireless user terminal comprises obtaining a connect time that indicates the duration of the user terminal's association with the WAP while connected to the server.

16. The method of claim 8, further comprising authenticating a user associated with said wireless user terminal as a condition for providing said wireless user terminal access to said network via the WAP.

17. An apparatus comprising:
   means for maintaining, at a wireless access point (WAP) of a network, information about wireless user terminals that access a server coupled to a network via the WAP;
   means for providing to the server billing information for the user terminals accessing the server, based on the information maintained at the WAP; and
   means for receiving from an operator of the server, a payment for an account associated with an operator of the WAP for providing transmission of data between the server and the wireless user terminals.

18. The apparatus of claim 17, wherein the WAP comprises a IEEE 802.11 access point.

19. The apparatus of claim 17, wherein the network comprises a worldwide network of interconnected networks commonly known as the Internet.

20. The apparatus of claim 17, wherein said means for maintaining, at a WAP of a network, information about data received at the WAP from a server comprises means for maintaining, at said WAP, information about data packets received at the WAP from the server and forwarded by the WAP to at least one wireless user terminal.

21. The apparatus of claim 17, wherein the information about data received at the WAP from the server comprises a count of bytes of data received at the WAP from the server.

22. The apparatus of claim 17, wherein the information about data received at the WAP from the server comprises a connect time during which the user terminal is associated with the WAP to receive data from the server.

23. The apparatus of claim 20, wherein the information about data packets received at the WAP from the server and forwarded to at least one wireless user terminal comprises a count of bytes of data received at the WAP from the server and forwarded by the WAP to the wireless user terminal using a Media Access Control address associated with the at least one wireless user terminal.

24. In a network having a server coupled thereto, and a wireless user terminal coupled thereto via a wireless access point (WAP) of the network, an apparatus comprising:
- means for posting to an account maintained at the WAP and associated with the wireless user terminal an accounting of services provided by the server to the wireless user terminal;
- means for receiving at the server a payment from the account in response to the posting; and
- means for providing from the server a portion of the payment to an account associated with an operator of the WAP.

25. The apparatus of claim 24, wherein said means for providing from the server a portion of the payment to an account associated with an operator of the WAP comprises:
- means for providing from the server a portion of the payment from the account to a billing entity; and
- means for providing from the billing entity a portion of the payment to the account associated with an operator of the WAP.

26. The apparatus of claim 24, wherein the billing entity and the server comprise the same device.

27. The apparatus of claim 24, wherein the server is operated by a content service provider and the billing entity is a separate device operated by a network service provider.

28. The apparatus of claim 24, wherein said means for posting to an account associated with the wireless user terminal an accounting of services provided by the server to the wireless user terminal comprises means for posting to an account associated with the wireless user terminal an accounting of services provided by the server to the wireless user terminal in accordance with billing information about the wireless user terminal.

29. The apparatus of claim 24, wherein the WAP comprises an IEEE 802.11 access point.

30. The apparatus of claim 24, wherein the network comprises a network of interconnected networks commonly known as the Internet.

31. The apparatus of claim 24, wherein said means for posting to an account associated with the wireless user terminal an accounting of services provided by the server to the wireless user terminal comprises means for obtaining a count of bytes of data transmitted from the server and received at the WAP for transmission to the wireless user terminal and calculating a payment for services provided by the server to the wireless user terminal based, at least in part, on the count.

32. The apparatus of claim 24, wherein said means for posting to an account associated with the wireless user terminal an accounting of services provided by the server to the wireless user terminal comprises means for obtaining a connect time that indicates the duration of the user terminal's association with the WAP while connected to the server.

33. An apparatus, comprising:
- an authenticator to enable access to a network through one or more wireless access points (WAPs), said authenticator being configured to:
  - receive information from at least one of said one or more WAPs about wireless user terminals that access a server coupled to a network via an associated WAP;
  - provide to the server, billing information for the user terminals that have accessed the server based, at least in part, on said the information received from said at least one of said WAPs; and
  - receive from the server, information regarding payment for an account associated with an operator of the at least one of said WAPs for transmitting data between the server and the wireless user terminals.

34. The apparatus of claim 33, wherein said at least one of said WAPs comprises a IEEE 802.11 access point.

35. The apparatus of claim 33, wherein the network comprises a worldwide network of interconnected networks commonly known as the Internet.

36. The apparatus of claim 33, wherein said information received from said at least one of said WAPs comprises information about data packets received at the at least one of said WAPs from said server and forwarded to at least one of said wireless user terminals.

37. The apparatus of claim 33, wherein said information received from said at least one of said WAPs comprises a count of bytes of data received at the at least one of said WAPs from the server.

38. The apparatus of claim 33, wherein said information received from said at least one of said WAPs comprises a connect time during which a user terminal is associated with the at least one of said WAPs to receive data from the server.

39. The apparatus of claim 36, wherein the information about said data packets comprises a count of bytes of data received at the at least one of said WAPs from the server and forwarded by the at least one of said WAPs to the at least one of said wireless user terminals using a Media Access Control address associated with the at least one of said wireless user terminals.

40. A network, comprising:
- an authenticator configured to:
  - post to an account maintained at the WAP and associated with a wireless user terminal, an accounting of services provided by a server to the wireless user terminal via a wireless access point (WAP); and
  - receive notification of payment from said server comprising a portion of payment to said server in response to the posting of the accounting of services.

41. The network of claim 40, wherein the server is operated by a content service provider.

42. The network of claim 40, wherein said authenticator is further configured to post to an account associated with the wireless user terminal an accounting of services provided by the server to the wireless user terminal in accordance with billing information about the wireless user terminal.

43. The network of claim 40, wherein the WAP comprises an IEEE 802.11 access point.

44. The network of claim 40, wherein the network comprises a network of interconnected networks commonly known as the Internet.

45. The network of claim 40, wherein said authenticator is further configured to:
- obtain a count of bytes of data transmitted from the server and received at the WAP for transmission to the wireless user terminal; and
- calculate a payment for services provided by the server to the wireless user terminal based, at least in part, on the count.

46. The network of claim 40, wherein said authenticator is further configured to obtain a connect time that indicates the duration of the user terminal's association with the WAP while connected to the server.

* * * * *

UNITED STATES PATENT AND TRADEMARK OFFICE
CERTIFICATE OF CORRECTION

| | | |
|---|---|---|
| PATENT NO. | : 8,101,000 B2 | |
| APPLICATION NO. | : 11/506378 | |
| DATED | : January 24, 2012 | |
| INVENTOR(S) | : Uhlik et al. | |

It is certified that error appears in the above-identified patent and that said Letters Patent is hereby corrected as shown below:

Title page, item (56), under "Other Publications", in Column 2, Line 2, delete "filed Sep. 18, 2001." and insert -- filed Sep. 28, 2001. --.

Column 1, line 2, below "Title" insert -- CROSS-REFERENCE TO RELATED APPLICATION --.

Column 9, lines 39-40, in Claim 2, delete "a IEEE" and insert -- an IEEE --.

Column 9, line 45, in Claim 4, delete "received a the" and insert -- received at the --.

Column 10, line 17, in Claim 12, delete "802.11 base-station access" and insert -- 802.11 access --.

Column 10, line 49, in Claim 18, delete "a IEEE" and insert -- an IEEE --.

Column 12, line 1, in Claim 33, delete "on said the information" and insert -- on said information --.

Column 12, line 8, in Claim 34, delete "a IEEE" and insert -- an IEEE --.

Signed and Sealed this
Fourteenth Day of August, 2012

David J. Kappos
*Director of the United States Patent and Trademark Office*